United States Patent
Kishimoto et al.

(10) Patent No.: US 9,298,734 B2
(45) Date of Patent: Mar. 29, 2016

(54) STORAGE SYSTEM, COMPUTER SYSTEM AND DATA MIGRATION METHOD

(71) Applicant: HITACHI, LTD., Tokyo (JP)

(72) Inventors: Satoru Kishimoto, Tokyo (JP); Yoji Nakatani, Tokyo (JP); Yoji Sunada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/426,428

(22) PCT Filed: Jun. 6, 2014

(86) PCT No.: PCT/JP2014/065089
§ 371 (c)(1),
(2) Date: Mar. 6, 2015

(87) PCT Pub. No.: WO2015/186248
PCT Pub. Date: Dec. 10, 2015

(65) Prior Publication Data
US 2015/0356078 A1 Dec. 10, 2015

(51) Int. Cl.
*G06F 17/30* (2006.01)

(52) U.S. Cl.
CPC ........ *G06F 17/302* (2013.01); *G06F 17/30174* (2013.01); *G06F 17/30091* (2013.01)

(58) Field of Classification Search
CPC . G06F 3/067; G06F 17/30174; G06F 17/302; G06F 11/2082; G06F 17/30091; Y10S 707/9994; Y10S 707/99953
USPC ....................................................... 707/610
See application file for complete search history.

(56) References Cited

U.S. PATENT DOCUMENTS

| | | | |
|---|---|---|---|
| 7,640,408 B1 * | 12/2009 | Halligan et al. | 711/162 |
| 7,689,786 B1 * | 3/2010 | Riordan et al. | 711/154 |
| 7,797,500 B1 * | 9/2010 | Lewis et al. | 711/162 |
| 9,021,296 B1 * | 4/2015 | Kiselev et al. | 714/6.23 |
| 2003/0110237 A1 | 6/2003 | Kitamura et al. | |
| 2005/0055402 A1 | 3/2005 | Sato | |
| 2005/0256898 A1 | 11/2005 | Akagawa et al. | |
| 2006/0107010 A1 | 5/2006 | Hirezaki et al. | |
| 2006/0129654 A1 | 6/2006 | Sato | |
| 2009/0300081 A1 | 12/2009 | Ueoka | |
| 2011/0302139 A1 | 12/2011 | Ueoka | |
| 2012/0137098 A1 * | 5/2012 | Wang et al. | 711/165 |

(Continued)

FOREIGN PATENT DOCUMENTS

| | | |
|---|---|---|
| JP | 2003-173279 A | 6/2003 |
| JP | 2005-084963 A | 3/2005 |

(Continued)

*Primary Examiner* — Than-Ha Dang
(74) *Attorney, Agent, or Firm* — Volpe and Koenig, P.C.

(57) ABSTRACT

The present invention provides a storage subsystem capable of realizing efficient data migration and high access performance. During migration of data between storage subsystems, data migration methods are selected between a "PUSH" type and a "PULL" type method based on a data migration policy set in advance to perform data migration processes. An access characteristics of a file and a folder storing the file are determined based on a file access frequency or a final access date and time information in a migration source storage subsystem, and the migration order of a file group determined to have a high possibility of being accessed during data migration is changed between the "PUSH" type and the "PULL" type.

10 Claims, 13 Drawing Sheets

(56) References Cited

U.S. PATENT DOCUMENTS

| | | | |
|---|---|---|---|
| 2012/0215740 A1* | 8/2012 | Vaillant et al. | 707/634 |
| 2012/0233299 A1* | 9/2012 | Attanasio et al. | 709/220 |
| 2012/0233418 A1* | 9/2012 | Barton et al. | 711/162 |
| 2012/0233490 A1* | 9/2012 | Barton et al. | 713/503 |
| 2015/0142861 A1* | 5/2015 | Gaddipati | 707/812 |
| 2015/0249625 A1* | 9/2015 | Jensen et al. | 709/206 |

FOREIGN PATENT DOCUMENTS

| | | |
|---|---|---|
| JP | 2005-321913 A | 11/2005 |
| JP | 2006-146476 A | 6/2006 |
| JP | 2009-288912 A | 12/2009 |

\* cited by examiner

FIG. 3

| inode | FILE NAME | FILE SIZE | FILE UPDATE DATE | FILE UPDATE SIZE | NUMBER OF FILE UDPATES | CONSISTENCY (MIGRATION / RECALL) FLAG |
|---|---|---|---|---|---|---|
| 1 | A | 2MB | 2014.2.1 | 1MB | 1 | OFF |
| 2 | B | 2MB | 2014.2.1 | 0MB | 0 | OFF |
| 3 | C | 3MB | 2014.2.1 | 1MB | 3 | OFF |
| 4 | D | 10MB | 2014.2.1 | 5MB | 1 | OFF |

STORAGE SYSTEM, COMPUTER SYSTEM AND DATA MIGRATION METHOD

TECHNICAL FIELD

The present invention relates to storage systems, computer systems and data migration methods.

BACKGROUND ART

When replacing file storage subsystems capable of storing electronic files used for businesses and sharing the same using a network, it is necessary to migrate the data (files, directory structures and the like) stored in existing file storage subsystems to a new file storage subsystem.

Generally, in such cases, a large amount of data is accumulated in the existing file storage subsystem being the migration source, and it takes a long time to migrate all the data. Therefore, in the prior art, a technique called online migration is known, where file operation and the like can be performed successively without stopping operation during the data migration processing, as taught in Patent Literatures 1 and 2.

CITATION LIST

Patent Literature

[PTL 1] United States Patent Application Laid-Open No. 2005/0256898 (Japanese Patent Application Laid-Open No. 2005-321913)

[PTL2] United States Patent Application Laid-Open No. 2003/0110237 (Japanese Patent Application Laid-Open No. 2003-173279)

SUMMARY OF INVENTION

Technical Problem

As the means of the above-mentioned online migration, there exists a "PUSH" type data migration method where the existing storage subsystem (hereinafter referred to as migration source storage subsystem) becomes the subject of the process to write data from the migration source storage subsystem to the storage subsystem used for replacement (hereinafter referred to as migration destination storage subsystem), and a "PULL" type data migration method where the migration destination storage subsystem reads the data from the migration source storage subsystem and stores the same in its own storage area.

The "PULL" type method is advantageous in that the migration destination storage subsystem virtualizes the migration source storage subsystem to enable immediate use of the performances and new functions of the new storage subsystem, but on the other hand, has a drawback in that during an initial read access to data (file) that has not yet been migrated, data must be read from the migration source storage subsystem, which may cause a response delay by the overhead of the process. Especially, the influence becomes significant when there are many read accesses and high access loads during the operation of the migration source storage subsystem.

On the other hand, according to the "PUSH" type method, the migration source storage subsystem can respond to access requests from client systems even during data migration, so that the above-described response delay will not be caused, but when update occurs to already migrated data, retransfer of data to the migration destination storage subsystem becomes necessary, which elongates data migration time, and the advantageous performance and functions of the migration destination storage subsystem cannot be enjoyed until the data migration is completed. According to the operation of the migration source storage subsystem, the influence becomes significant when there are much write accesses and high access load.

According to the prior art technique, smooth data migration was prevented due to the drawbacks both caused by an external factor where the migration is greatly influenced by the operation environment of the user, and by an internal factor where the data migration method itself basically only copied files sequentially from the route of the migration target file system, without considering the access frequencies and the like of the files, and the efficiency was not good. Therefore, a large difference may exist between the actual time and the estimated required time for completing data migration calculated based simply on the amount of data of the processing target and the system performance information, and it was extremely difficult to plan the migration operation or to manage the schedule thereof. The present invention aims at providing a storage system capable of realizing efficient data migration and high access performances.

Solution to Problem

In order to solve the above-described problems, according to one preferred embodiment of the present invention, in migrating data between the migration source storage subsystem and the migration destination storage subsystem, either a "PUSH" type or "PULL" type data migration method is selected based on a predetermined data migration policy, to perform the data migration processing. Further, the access characteristics of the file or the folder storing the file is determined based for example on the file access frequency or the final access date and time information in the migration source storage subsystem, and the order of migration of the group of files determined to have a high possibility of being accessed during data migration is changed between the "PUSH" type and the "PULL" type. Further, during data migration of file storage subsystems, the data migration method is selected between the "PUSH" type or the "PULL" type based on the data migration policy determined in advance.

Advantageous Effects of Invention

According to the storage system of the present invention, data migration is performed based on the "PULL" type data migration, prioritizing the files having higher access frequencies, so that the occurrence of delay of responses can be suppressed during operation of files by the users. Furthermore, by performing data migration based on the "PUSH" type data migration by prioritizing migration of files having a low access frequency and a large capacity, it becomes possible to enhance the data migration efficiency and to reduce the data migration time. The problems, configurations and effects other than those described above will become apparent from the following description of the preferred embodiments.

BRIEF DESCRIPTION OF DRAWINGS

FIG. 3 is a view illustrating a configuration example of a file management table.

DESCRIPTION OF EMBODIMENTS

Figure 1:
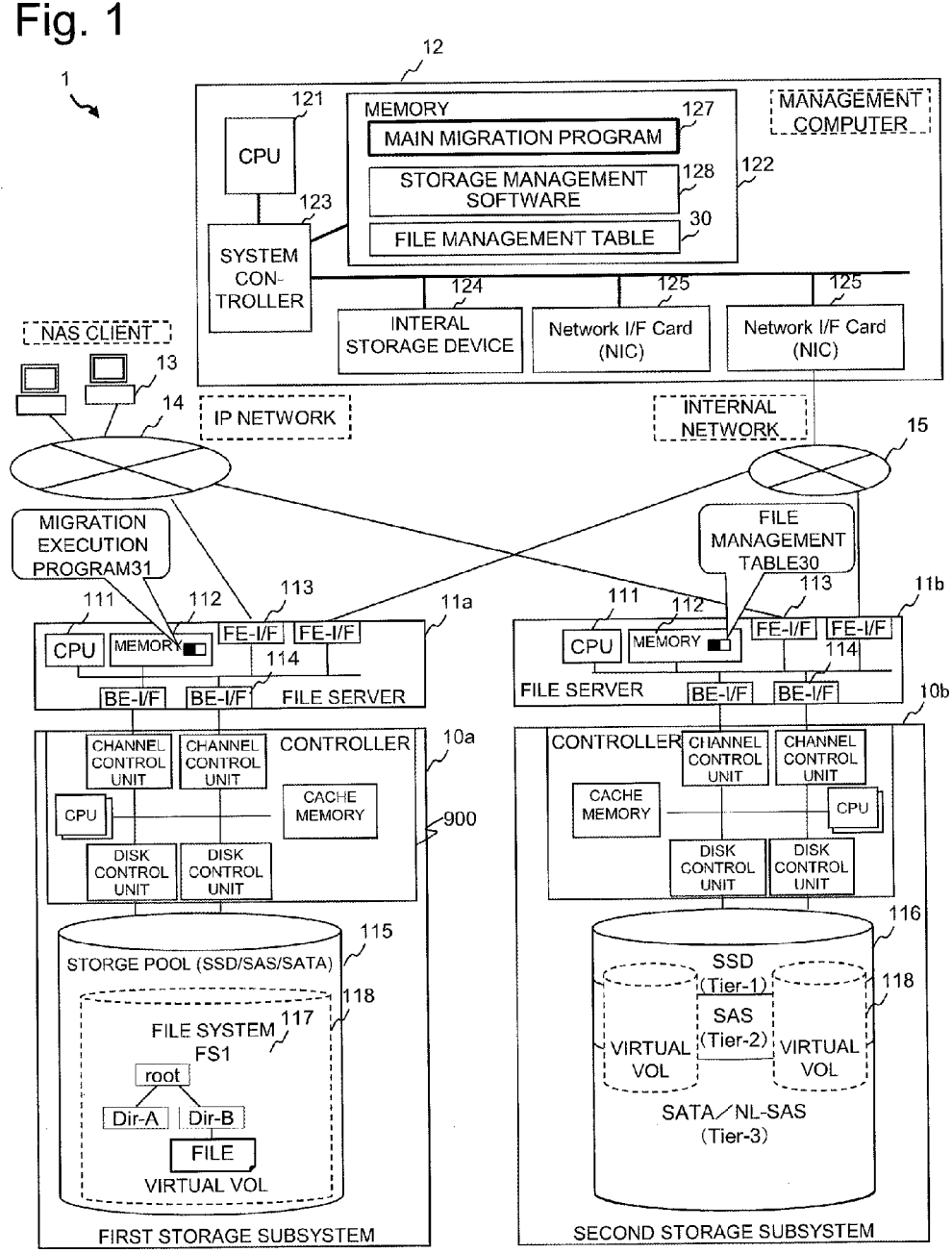
FIG. 1 is a block diagram of showing the major hardware according to a computer system of the present embodiment.

Now, the preferred embodiments of the present invention will be described with reference to the drawings. In the following description, various information are referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer programs can be installed to each computer from a program source. The program source can be provided via a program assignment server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

Embodiment 1

Computer System Configuration

FIG. 1 is a block diagram of major hardware included in a computer system according to the present embodiment. A computer system 1 has a first storage subsystem (hereinafter referred to as migration source storage subsystem) 10a, a second storage subsystem (hereinafter referred to as migration destination storage subsystem) 10b, a first file server (hereinafter referred to as migration source file server) 11a for controlling the migration source storage subsystem 10a, a second file server (migration destination file server) 11b for controlling the migration destination storage subsystem 10b, a management computer 12 for managing the migration source file server 11a and the migration destination file server 11b, and a NAS client computer (hereinafter referred to as client computer) 13, which are coupled via an IP network 14 or an internal network 15. The migration source storage subsystem 10a and the migration destination storage subsystem 10b can be collectively referred to as a storage subsystem 10. Similarly, the migration source file server 11a and the migration destination file server 11b can be collectively referred to as a file server 11.

The storage subsystem 10 has a storage controller unit 900 for controlling data transmission and reception with the file server 11 by controlling the storage drive, and a storage pool 115 composed of multiple storage drives. The storage pool 115 allocates storage drives having different access performances such as SSD/SAS-HDD/SATA-HDD by dividing the same into multiple tier levels. Further, the storage pool 115 is composed so that file systems (FS1) 117 are disposed for each virtual VOL 118. The virtual VOL 118 is formed astride the tiers, and real areas of the respective tiers are allocated to the virtual areas of the virtual VOL 118.

The file server 11 has a CPU 111 for controlling the whole system, a memory 112 for storing control information of the system or control programs for controlling the system, an FE (Front End)-I/F (Interface) for communicating with the management computer 12 or the client computer 13, and a BE (Back End)-I/F for communicating with the storage subsystem 10. A file management table 30 for managing files transferred between the migration source storage subsystem 10a and the migration destination storage subsystem 10b and a migration program 31 for controlling actual data transfer are stored in the memory 112 of the file server 11.

The management computer 12 has a CPU 121 for controlling the whole system, a memory 122 for storing control information and control programs, a built-in storage device 124 composed of HDDs (Hard Disk Drives) and SSDs (Solid State Drives) storing data and the like, an NIC (Network I/F Card) 125 for communicating with the file server 11, and a system controller 123 for connecting the respective components.

A main migration program 127 for controlling the overall migration, such as determining a data (file) transfer type (migration type) between the migration source storage subsystem 10a and the migration destination storage subsystem 10b or updating the file management table 30, a storage management software 128 for managing the configuration information of the storage subsystem 10 and the number of accesses (number of reads/number of writes) per file or the access ratio (read/write ratio) and the like, and a file management table 30 for managing the transfer files between the migration source storage subsystem 10a and the migration destination storage subsystem 10b, are stored in the memory 122 of the management computer 12.

In the present embodiment, the data transfer method for data migration between the migration source file server 11a and the migration source storage subsystem 10a or the migration destination file server 11b and the migration destination storage subsystem 10b is selected, with the aim to improve the transfer efficiency, shorten the transfer time, and enjoy the high performances of the transfer destination storage subsystem 10b having a high access performance. That is, files having a high access frequency have a high possibility of being updated. Re-transfer occurs when the files are updated, so that the transfer efficiency is deteriorated. Therefore, we will consider a case where data transfer (migration) is postponed, and a case where data transfer (migration) is prioritized to make use of the processing performance of the new server (migration destination server) having a high access performance.

According to the present embodiment, information such as access frequency, data capacity, data capacity rate, update date and time and the like of each folder or each file is managed for each tier (tree) in a directory tree structure. Then, by determining the migration policy based on this information, the transfer method is selected from the following three methods to perform data migration.

(1) "PUSH" type: A method where migration is performed from a directory (folder) or file having a low access frequency and a maximum capacity ratio (2) "PULL" type: A method where migration is performed from a directory (folder) or file having a high access frequency (3) "HYBRID" type: A method where the "PUSH" type migration and the "PULL" type migration are performed in combination <Storage Subsystem Configuration>

Figure 2:
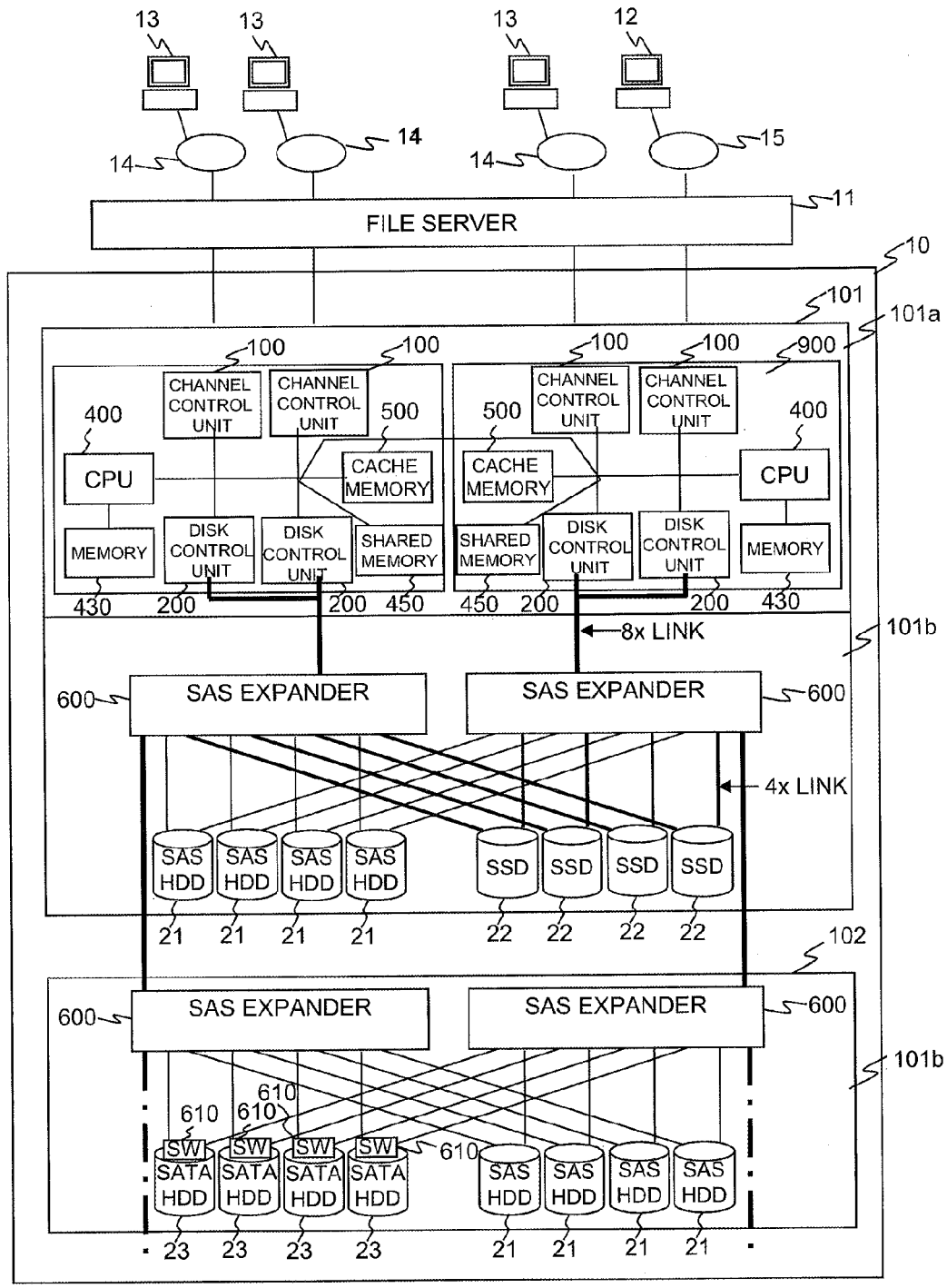
FIG. 2 is a main block diagram of a storage subsystem.

FIG. 2 is a main block diagram of the storage subsystem. The storage subsystem 10 is coupled via the file server 11 and networks 14/15 to a management computer (management server) 12 and the client computers 13.

The storage subsystem 10 has a basic chassis 101 and an expanded chassis 102. The basic chassis 101 has a controller unit 101a and a drive unit 101b. The expanded chassis 102 has a drive unit 101b. The controller unit 101a has multiple storage controller units 900. Each storage controller unit 900 has channel control units 100, disk control units 200, a CPU 400, a memory 430, a shared memory 450, and a cache memory 500.

The channel control unit 100 is a controller for transmitting and receiving user data and configuration information to/from the file server 11. The disk control unit 200 is a controller for transmitting and receiving data to/from the storage devices of the drive unit 101b. The CPU 400 is a processor for controlling the whole storage subsystem 10. The memory 430 is for storing various programs and various tables executed by the CPU 400. The shared memory 450 is a memory for storing control information and the like used in a shared manner among the CPUs 400. The cache memory 500 is a memory for temporarily storing user data from HDDs (SAS-HDD 21, SATA-HDD 23) and SSDs 22, which are storage devices of the file server 11 or the drive unit 101b. Further, the SATA-HDD 23 has a switch 610 for connecting via the SAS-I/F.

The drive unit 101b has SAS expanders 600 for connecting a number of drives equal to or greater than the number of SAS ports, and the above-mentioned multiple storage drives. The disk control units 200 and the SAS expanders 600 are coupled via 8 wide links (eight lines), and the SAS expanders 600 are coupled via 4 wide links (four lines).

<File Management Table>

FIG. 3 is a view illustrating a configuration example of a file management table. The file management table 30 is a management information of each file, including statistical information (such as access frequency, update frequency and read/write rate) and capacity information (such as file capacity and update capacity), and which is used both in the migration target ("PULL" type)/non-target ("PUSH" type). The file management information includes, other than the file management table 30, a folder capacity information described later and inode information. The file management table 30 is not necessarily managed only by the management computer 12, and it can be managed within the file server 11 or the storage subsystem 10. Moreover, management by the file management table 30 can be performed in folder units, instead of file units. In that case, the respective entries of the file management table 30, from file name 302 through number of file updates 306, is changed to folder name 302 through number of folder updates 306.

The file management table 30 has a file inode information (path information) 301, a file name 302 for uniquely identifying files in a file system, a file size 303, a file update date and time 304 showing the date and time information of final update of a file, a file update size 305 showing a data capacity of update portion of the file, a number of times of file update 306, and a consistency (migration/recall) flag 307 for storing consistency (coincidence) information of respective files in the first storage subsystem (migration source storage subsystem) 10a and the second storage subsystem (migration destination storage subsystem) 10b.

<Main Migration Program Processing>

Figure 4:
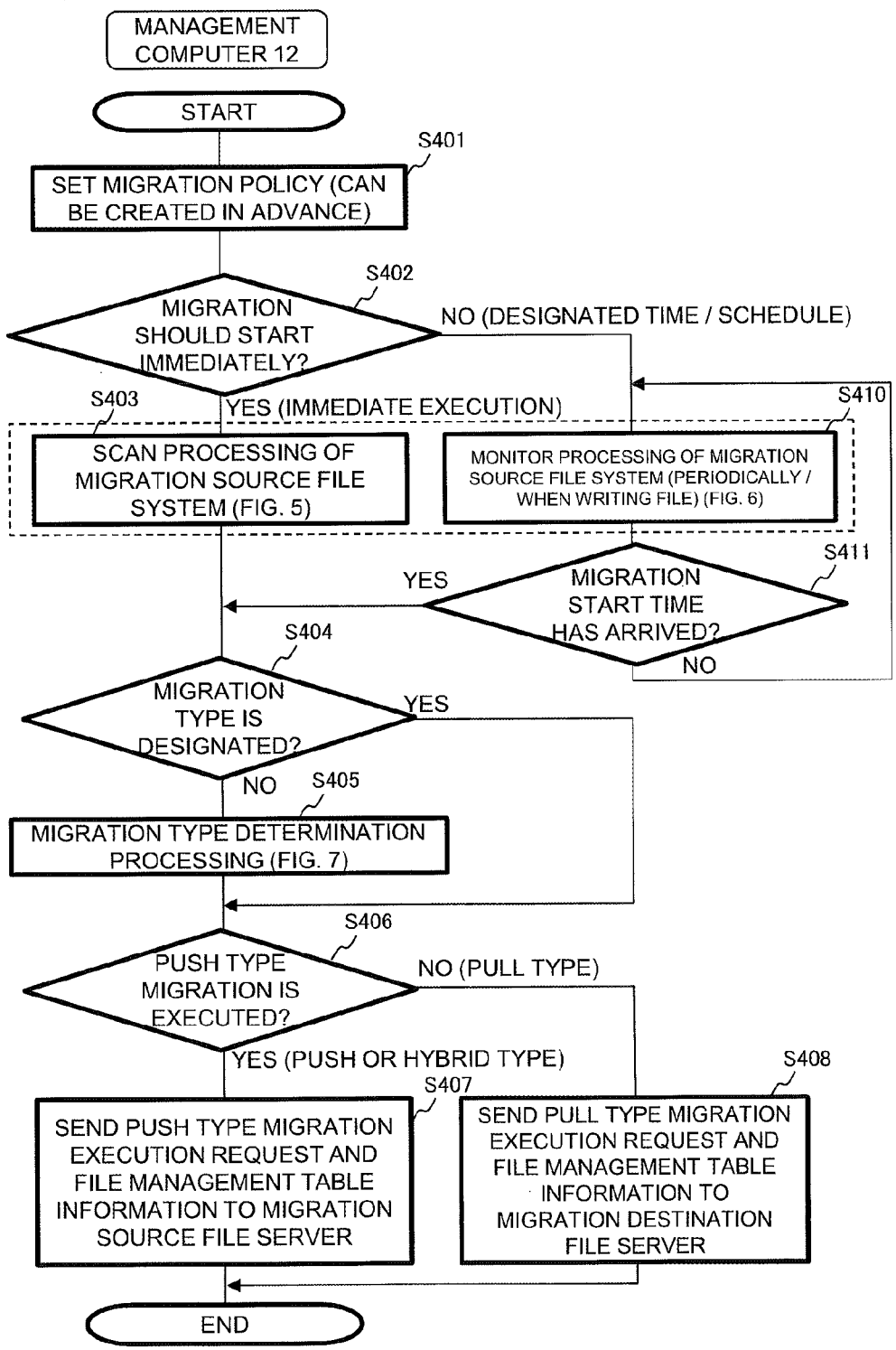
FIG. 4 is a flowchart illustrating the processing contents of a main migration program.

FIG. 4 is a flowchart illustrating the processing contents of a main migration program. The process performed in the main migration program 127 is a process for determining the method for executing migration. The management computer 12 can be set as the subject of the process, but the CPU 121 of the management computer 12 can also execute the process. It is also possible to store the main migration program 127 in the memory 112 of the file server 11 or the memory 430 and the shared memory 450 of the storage subsystem 10, and to execute the program by the CPU 111 of the file server 11 or the CPU 400 of the storage subsystem 10.

In S401, the management computer 12 receives a migration policy set by the system administrator. According to the structure of the migration policy, for example, a migration policy for determining "PUSH"/"PULL" type is coupled to the application range (such as subsystem/file system/folder unit) of the policy. The migration policy for determining the "PUSH"/"PULL" type is composed for example of the following:

(P11) Storage Subsystem Operation Policy: Setting necessary access performance, deployment (deployment of devices such as disk capacity and cache memory capacity) conditions and the like (P12) Access Status Determination Policy: Setting determination conditions based on access frequency (such as high: "PUSH" type, low: "PULL" type) and access rate (such as high write access: "PUSH" type, low write access: "PULL" type)

(P13) Data Capacity Policy: Setting condition of data capacity to be migrated (such as large: "PUSH" type, small: "PULL" type)

(P14) Tier Control Interlock Policy: Setting the tier prioritizing data migration (such as Tier1 (SSD): "PULL" type, Tier3 (SATA): "PUSH" type)

(P15) Schedule Related Policy: Setting condition of start/end time of data migration For example, by setting (P15) the start time and end time of data migration by the schedule related policy, migration can be performed during nighttime or on Holidays when there are smaller number of users using the storage system, so that efficiency of data transfer can be enhanced.

The migration policy for determining the "PUSH"/"PULL" type has one or more configuration information composed of a "PUSH"/"PULL" type detailed policy (such as the processing option) coupled thereto. The "PUSH"/

"PULL" type detailed policy (such as the processing option) is composed for example of the following:

(P21) Specific Folder Prioritize Policy: Set for respective use cases of users (general users/developers etc.)

(P22) Designated Attribute File Prioritize Policy: Setting file attribute (WORM (Write Once Read Many) attribute, file identifier and the like) to be subjected to data migration with priority (P23) Encryption/Deduplication/Compression and other Additional Processing Designate Policy: Setting classification of processes to be subjected to data migration with priority (P24) Tier Control Interlock Policy: Same as (P14)

(P25) Required Access Performance Policy: Setting conditions and the like satisfying required access performance For example, as according to (P23) encryption/deduplication/compression and other additional processing designate policy, by performing data transfer after reducing the capacity of data to be subjected to deduplication or compression, it becomes possible to improve transfer efficiency and reduce transfer time.

According to the migration policy, it is also possible to provide multiple configuration information and to switch from one to another based on a set schedule or the like. Furthermore, the migration policy is mainly used for determining a "PUSH" type/"PULL" type method, but in addition, it can be used for designating the level of priority of a designated folder during migration, or can be set to perform detailed designation of whether the method for monitoring file update should be set to "accumulate" (those having exceeded a threshold value even once are registered in a table and not deleted therefrom) or to "update" (entries that have not been accessed during monitoring period are deleted (S608 of FIG. 6)).

In S402, the management computer 12 determines whether the migration is to be immediately started or not. If it should be immediately started (YES: immediate execution), the management computer 12 executes S403. If it should not be immediately started (NO: time designation, schedule), the management computer 12 executes S410.

Figure 5:
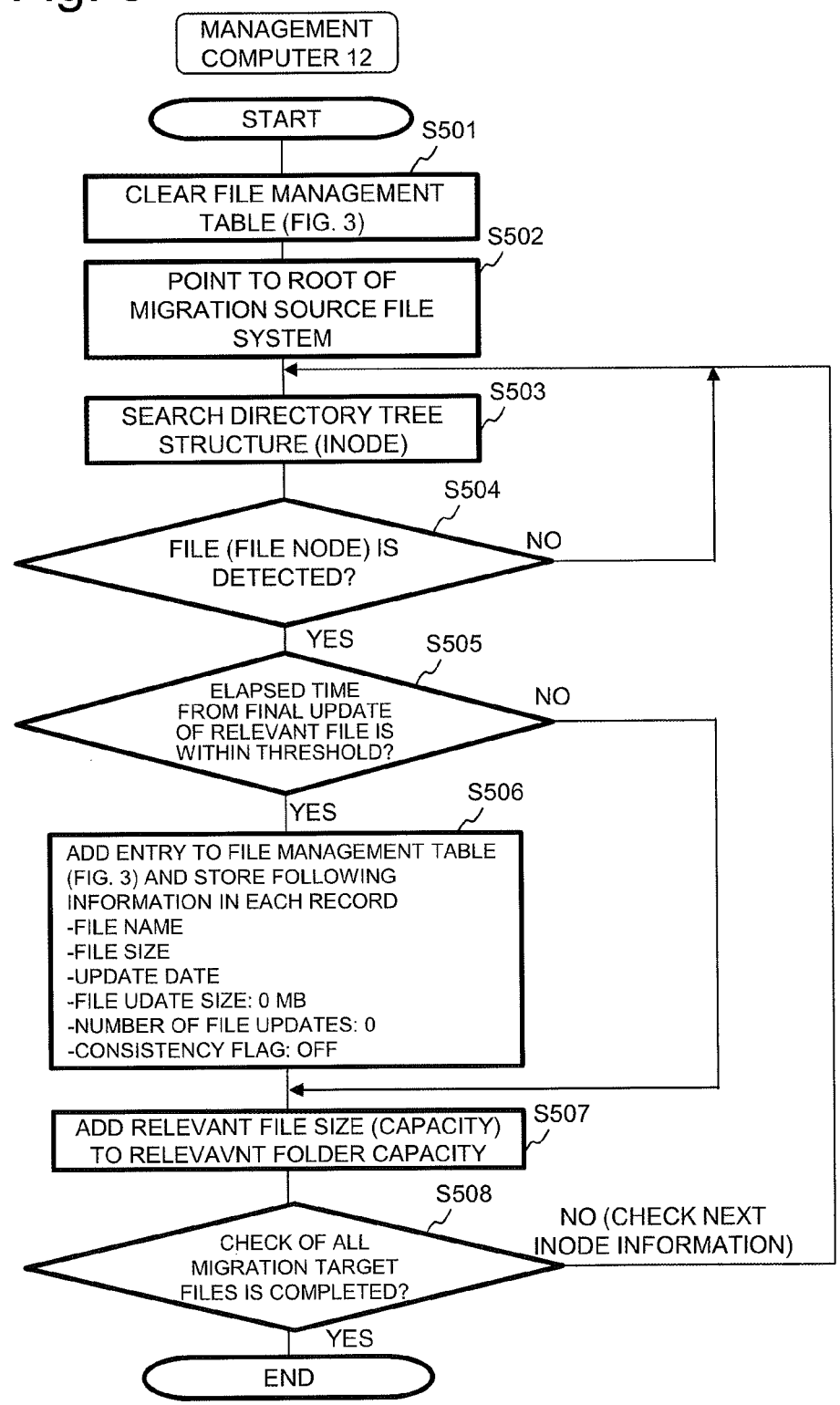
FIG. 5 is a flowchart illustrating a migration source file system scan processing.

In S403, the management computer 12 executes a migration source file system scan processing illustrated in FIG. 5. The migration source file system scan processing is a process performed for generating statistical information (such as access frequency, total data capacity, data capacity per folder, file capacity ratio, and folder capacity ratio).

In S404, the management computer 12 determines whether designation of migration type ("PUSH" type or "PULL" type) is included or not in the migration policy. If designation exists (YES), the management computer 12 executes S406. If designation does not exist (NO), the management computer 12 executes S406 after executing S405. In S405, the management computer 12 executes a migration type determination processing illustrated in FIG. 7.

In S406, the management computer 12 determines whether the result of the migration type determination processing of S405 indicates execution of a "PUSH" type migration or not. If it indicates execution of a "PUSH" type migration (YES: "PUSH" type or "HYBRID" type), the management computer 12 executes S407. If it does not indicate execution of a "PUSH" type migration (NO: "PULL" type), the management computer 12 determines that there is an execution request of a "PULL" type migration, and executes S408. A "HYBRID" type migration is a migration system where data migration is performed by combining the "PUSH" type migration and the "PULL" type migration.

In S407, the management computer 12 transmits a request to execute the "PUSH" type migration and the information of the file management table 30 to the migration source file server 11a (or the migration source storage subsystem 10a). In S408, the management computer 12 transmits a request to execute the "PULL" type migration and the information of the file management table 30 to the migration destination file server 11b (or the migration destination storage subsystem 10b).

Figure 6:
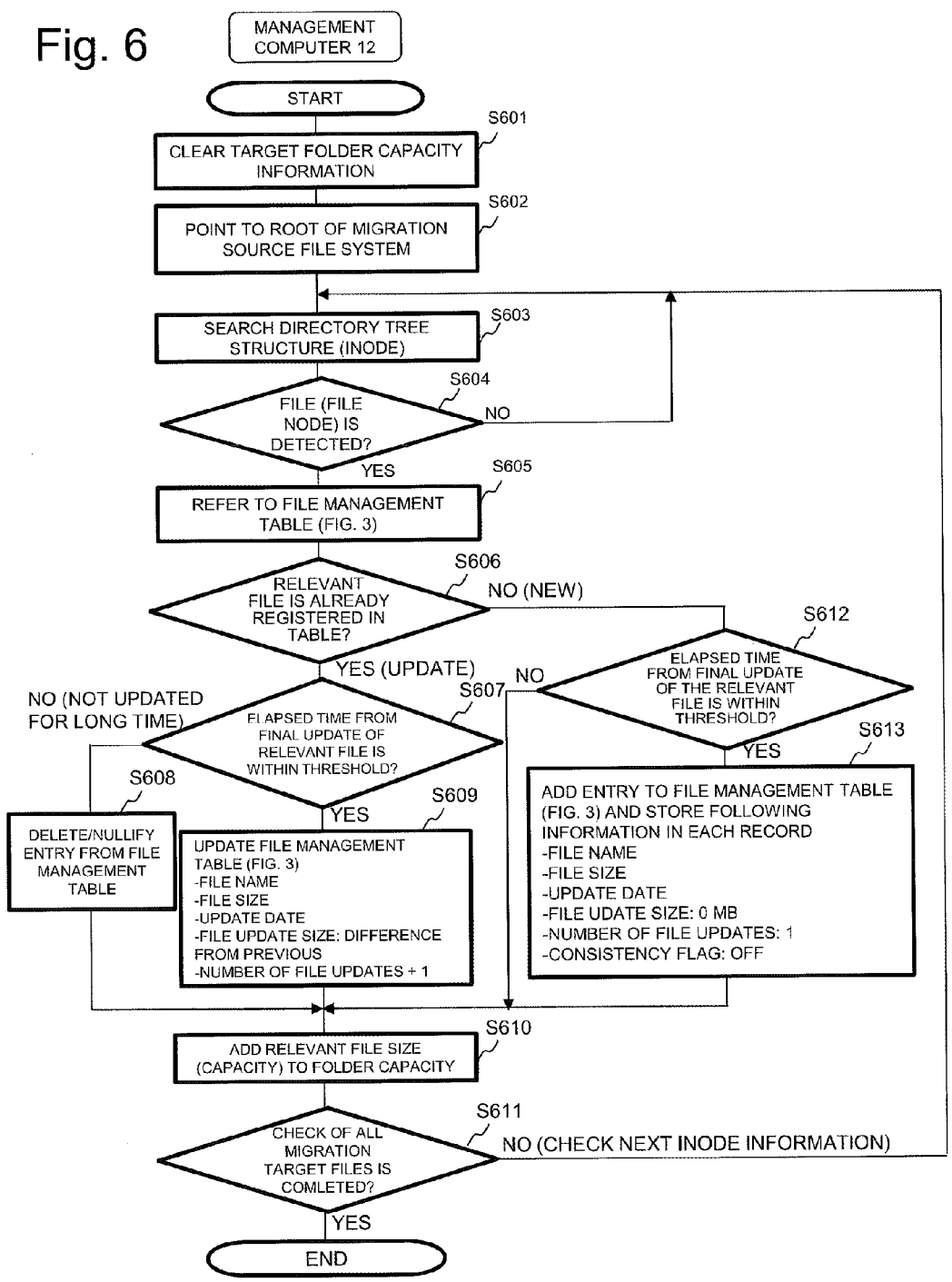
FIG. 6 is a flowchart illustrating a migration source file system monitor processing.

In S410, the management computer 12 executes a migration source file system monitor processing illustrated in FIG. 6. The process of S410 is executed either periodically or when a data is written to a file. The processes illustrated in the dotted box (S403 and S410) can also be executed by the migration source storage subsystem 10a. In S411, the management computer 12 determines whether the current time has reached a migration start time or not. If the time has reached the migration start time (YES), the management computer 12 executes S404. If the time has not yet reached the migration start time (NO), the management computer 12 executes S410 again. By the steps described above, the migration execution system can be determined.

<Migration Source File System Scan Processing>

FIG. 5 is a flowchart illustrating a migration source file system scan processing. The present processing is for generating statistical information (such as access frequency, total data capacity, data capacity per folder, file capacity ratio and folder capacity ratio) in the migration source file system. The processes of FIG. 5 and thereafter are executed by the migration execution program 31 or the main migration program 127, but it is also possible to have the subject of the processes set to the management computer 12, the migration source storage subsystem 10a or the migration source file server 11a. The subject of the processes can also be set to the CPU 121 of the management computer 12, the CPU 111 of the migration source file server 11a or the migration source file server 11a, or the CPU 400 of the migration source storage subsystem 10a or the migration destination storage subsystem 10b.

In S501, the management computer 12 clears the contents of the file management table 30. In S502, the management computer 12 points to (designates) a root (top tree folder (top directory)) of the file system in the migration source storage subsystem 10a as a search start position. In the case of data migration of a specific directory, the folder of the initial directory of the relevant directory is pointed as the search start position. In S503, the management computer 12 searches the directory tree structure (inode). At first, the management computer 12 initializes the accumulated folder capacity of the folder being searched to zero.

In S504, the management computer 12 determines whether a file (file node) has been detected (exists) in the folder being searched or not. If a file is detected (YES), the management computer 12 executes S505. If a file is not detected (NO), the management computer 12 determines that the file being searched is an empty folder where no file exists, and it executes S503 again to search the next inode (a folder of a one-step-lower tier, or a different folder having diverged from a folder of a one-step-higher tier).

In S505, the management computer 12 determines whether the elapsed time from final update of the file is within a threshold (such as within three days from date of final update) or not. If it is not within a threshold (NO), the management computer 12 executes S507. If it is within a threshold (YES), the management computer 12 determines that the file is a file having a high access frequency that will be updated again within three days, and executes S507 after executing S506. By this process S505, a file having a high access frequency can be specified. In S506, the management computer 12 adds an entry to the file management table 30 (FIG. 3), and stores the following information (R11) through (R16) in the respective records of the added entry.

(R11) File name 302
(R12) File size 303
(R13) Update date and time 304
(R14) File update size 305: 0 MB
(R15) Number of file updates 306: 0
(R16) Consistency flag 307: Off In S507, the management computer 12 adds the size (capacity) of the detected file to the accumulated folder capacity. In S508, the management computer 12 determines whether the check of all migration target files has been completed or not. If the check has been completed (YES), the management computer 12 ends the migration source file system scan processing. If the check has not been completed (NO), the management computer 12 re-executes the processes of S503 and thereafter to check the next inode information. In the description of the processes from S504 to S507, it is assumed that one folder is either empty or stores only one file. However, if there are two or more files within a folder, the management computer 12 executes the processes from S504 to S507 for a number of times corresponding to the number of existing files. According to the above-described process, it becomes possible to generate the statistical information in a file system of the migration source storage subsystem 10a.

<Migration Source File System Monitor Processing>

FIG. 6 is a flowchart illustrating a migration source file system monitor processing. Similar to the migration source file system scan processing, the migration source file system monitor processing is also a process for generating statistical information. The present process is executed periodically until the scheduled migration start time arrives. However, the process can be stopped during a time window such as when a data backup process or a virus scanning process is performed. Further, the present process can also be executed in the migration source storage subsystem 10a or the migration source file server 11a.

In S601, the management computer 12 clears the capacity information of the target folder (initializes the accumulated folder capacity to zero). The processes from S602 to S604 are the same as the processes from S502 to S504, so that the description thereof is omitted. In S605, the management computer 12 refers to the file management table 30 in the memory 122. Further, when the migration source storage subsystem 10a performs the present process of S605, the determination of the present step and thereafter can be performed when writing data in the file. In that case, the elapsed time of determination processes S607 and S612 will always be within a threshold value. Further, the folder capacity calculation in this case will be performed by calculating the difference of file size when updating the file, and adding or subtracting the same.

In S606, the management computer 12 determines whether the file detected in S604 is already registered in the file management table 30 or not. If the detected file is already registered (YES), the management computer 12 determines that that the detected file is updated, and executes S607. If the detected file is not already registered (NO), the management computer 12 determines the detected file as a new file, and executes S612.

The process of S607 is the same as the process of S505. The management computer 12 executes S609 if the elapsed time from final update of the detected file is within a threshold value (YES), and executes S608 if it is not within a threshold value (NO). In S608, the management computer 12 deletes and nullifies an entry corresponding to the detected file from the file management table 30. In S609, the management computer 12 updates the entry corresponding to the detected file in the file management table 30 by the following information (R21) through (R25).

(R21) File name 302
(R22) File size 303
(R23) Update date and time 304
(R24) File update size 305: Difference in capacity from previous time
(R25) Number of file updates 306: Increment by one (+1)

The process of S610 is the same as S507, and the process of S611 is the same as S508. In S612, the management computer 12 determines whether the elapsed time from final update of the detected file is within a threshold value or not. The process of S612 is the same as the process of S505 or S607. In S613, the management computer 12 adds an entry to the file management table 30, stores the following information (R31) through (R36) in the respective records, and updates the file management table 30.

(R31) File name 302
(R32) File size 303
(R33) Update date and time 304
(R34) File update size 305: 0 MB
(R35) Number of file updates 306: 1
(R36) Consistency flag 307: Off Then, the management computer 12 executes the aforementioned S610 and S611.

According to the above-described migration source file system monitor processing, it becomes possible to determine the file and folder to be subjected to data migration, and the order of priority (order of data transfer) of the file or folder to be subjected to data migration based on access frequency and data capacity ratio, before the migration start time has been reached.

<Migration Type Determination Processing>

Figure 7:
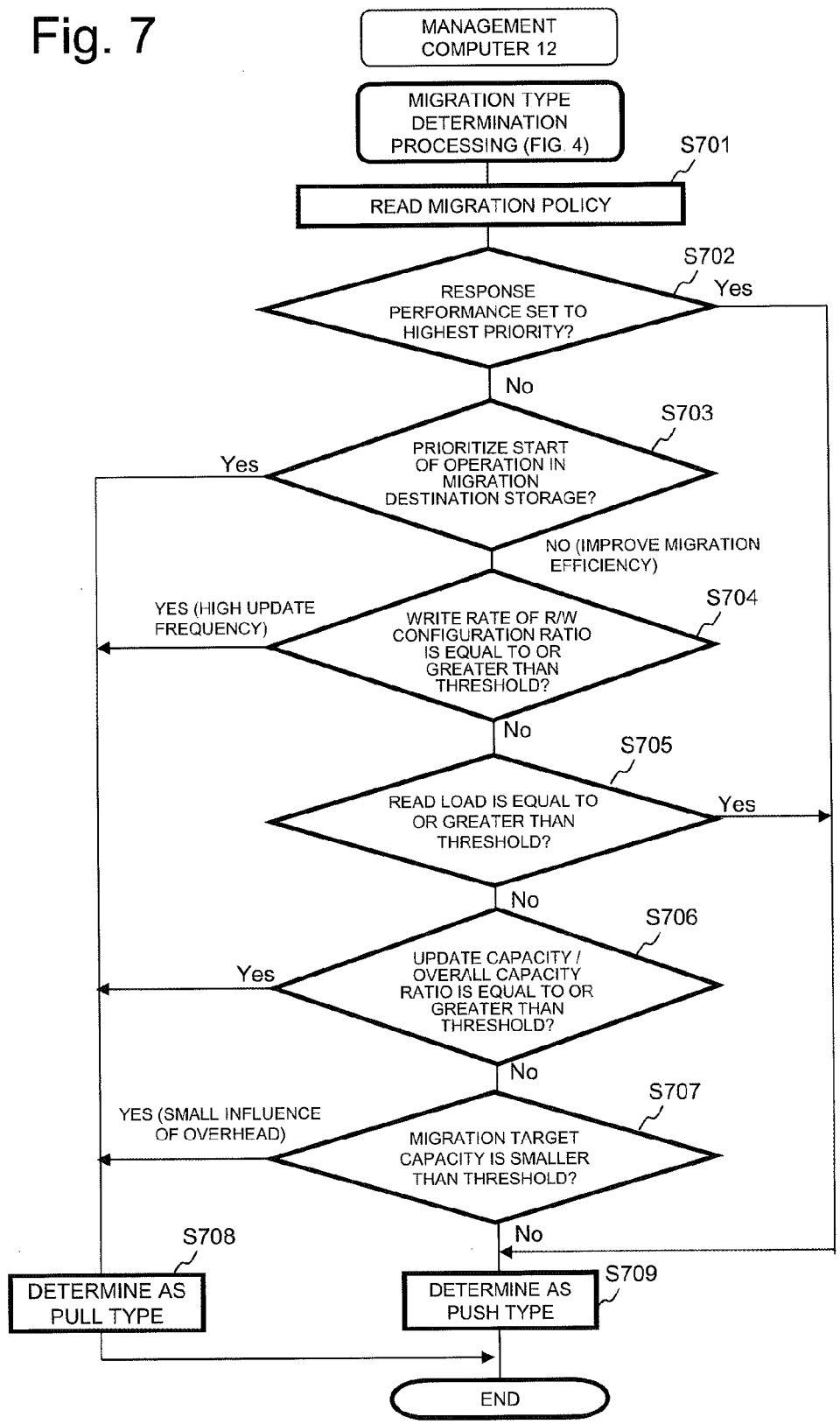
FIG. 7 is a flowchart illustrating a migration type determination processing.

FIG. 7 is a flowchart illustrating a migration type determination processing. The migration type determination processing is a process for determining the migration type from either the "PULL" type of the "PUSH" type based on the migration policy, the access frequency, the ratio of access type (read/write), and the file/folder capacity and rate.

In S701, the management computer 12 reads the migration policy information set in advance from the memory 122. At first, the system administrator considers one or more migration policy information from system configuration, operation status, load curve (relationship between time and load), access status (access frequency, access type) and the like, and the management computer 12 having received the determined migration policy information stores the same in the memory 122. Further, the management computer 12 acquires the operation information (data storage capacity, used storage capacity, data update capacity, access status (access frequency, access type), response performance and the like) of the migration source storage subsystem 10a from the migration source storage system 10a, and stores the same in the memory 122. Then, in the processes of S702 and thereafter, the migration type (system) is determined based on the migration policy information set in advance and the operation information of the migration source storage subsystem 10a.

In S702, the management computer 12 determines whether the response performance should be most prioritized or not based on the (P11) subsystem operation policy (performance/deployment condition and the like) of the migration policy information. If the response performance is most prioritized (YES), the management computer 12 executes S709 and determines that the migration type is the "PUSH" type. If the response performance is not prioritized most (NO), the management computer 12 executes S703.

In S703, the management computer 12 determines whether the starting of operation of the migration destination system should be prioritized or not based on the (P11) subsystem operation policy (performance/deployment condition and the like) of the migration policy information. If the starting of operation is to be prioritized (YES), the management computer 12 executes S708 and determines that the migration type is the "PULL" type. If it should not be prioritized (NO), the management computer 12 determines that improvement of migration efficiency should be prioritized, and executes S704.

In S704, the management computer 12 determines whether the write access rate of the R (Read)/W (Write) access component rate is equal to or greater than a threshold value or not based on the set value of the (P12) access status determination policy of the migration policy information. If the write access rate is equal to or greater than a threshold value (YES), the management computer 12 determines that the update frequency is high, and determines that the migration type is the "PULL" type (S708). If the write access rate is smaller than a threshold value (NO), the management computer 12 executes S705.

In S705, the management computer 12 determines whether the Read load (such as the number of times of read per unit time, or the processing time per single read) is equal to or greater than a threshold or not based on the set value by the (P12) access status determination policy of the migration policy information. If the Read load is equal to or greater than a threshold value (YES), the management computer 12 determines that the migration type is the "PUSH" type (S709). If the Read load is smaller than the threshold value (NO), the management computer 12 executes S706.

In S706, the management computer 12 determines whether the update capacity/overall capacity ratio is equal to or greater than a threshold value or not based on the set value of the (P13) data capacity policy of the migration policy information. For example, the threshold value of the update capacity/overall capacity rate is set to 20%, wherein if the value exceeds 20%, it is determined that there are many updates, so that the "PULL" type migration is selected. Further, the update capacity (total capacity of updated file or total capacity of the updated portion) can be calculated based on the file size 303 or the file update size 305 of the registered file in the file management table 30. The respective folder capacity or the total capacity of all folders is used as the overall capacity. If the update capacity/overall capacity rate is equal to or greater than a threshold value (YES), the management computer 12 determines that the migration type is the "PULL" type (S708). If the update capacity/overall capacity rate is smaller than a threshold (NO), the management computer 12 executes S707.

In S707, the management computer 12 determines whether the migration target capacity is smaller than a threshold or not based on the set value in the (P13) data capacity policy in the migration policy information. If the migration target capacity is smaller than a threshold value (YES), the management computer 12 determines that the influence of overhead of the data migration process is small, and determines that the migration is the "PULL" type (S708). If the migration target capacity is not smaller than the threshold value (NO), the management computer 12 determines that the influence of overhead of the data migration process is high, and determines that the migration type is the "PUSH" type (S709).

By performing the migration type determination processing using the migration policy, it becomes possible to determine the appropriate migration type ("PULL" type or "PUSH" type). In FIG. 7, the migration type has been determined based on six factors from S703 to S707, but the migration type can also be determined based on five factors from S703 to S706. Further, in addition to the six factors from S703 to S707, for example, the determination can also be performed by adding a factor related to tier policy.

<"PUSH" Type Migration Processing>

Figure 8:
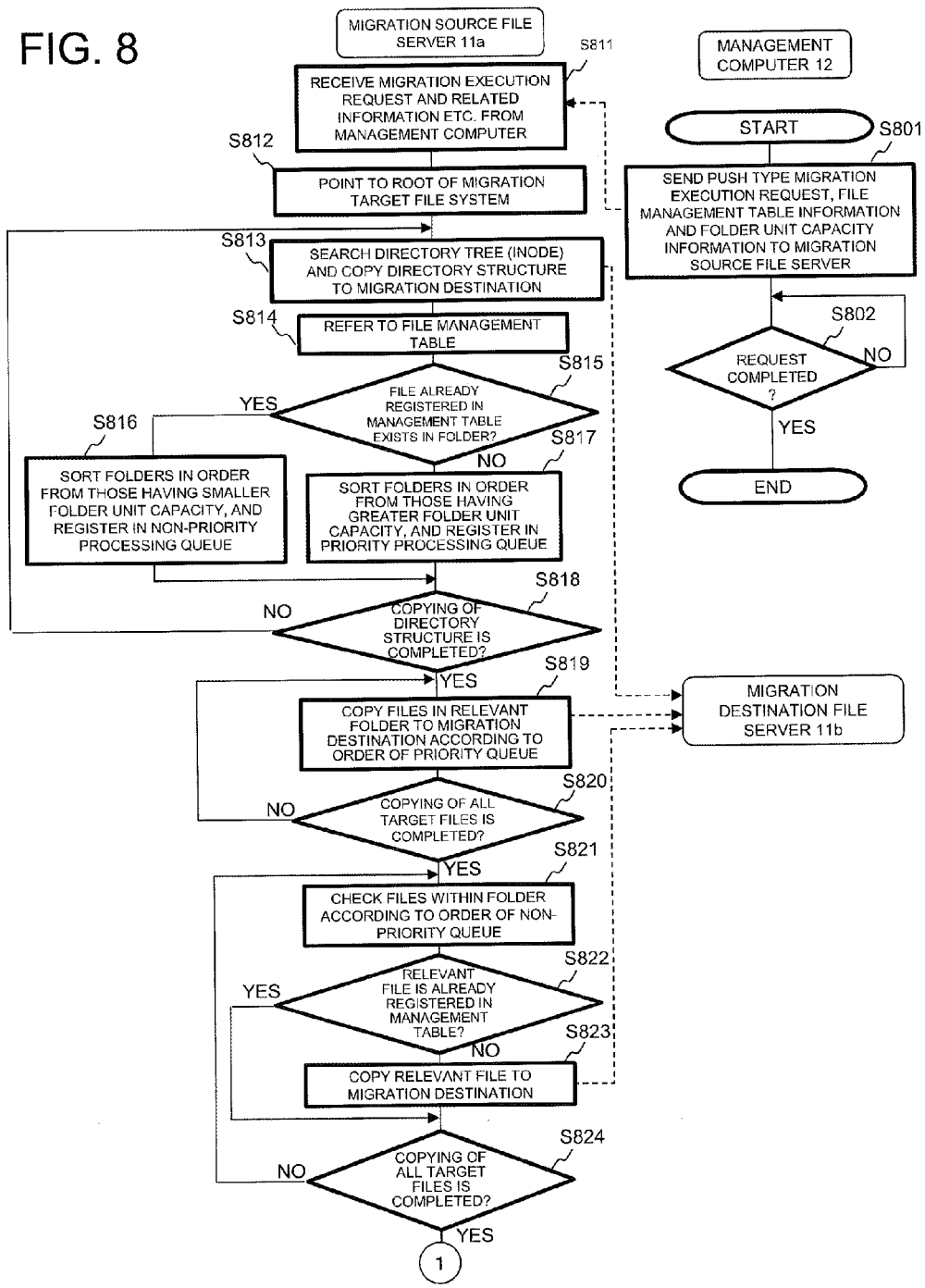
FIG. 8 is a flowchart of a "PUSH" type migration processing according to a migration source file server.
Figure 9:
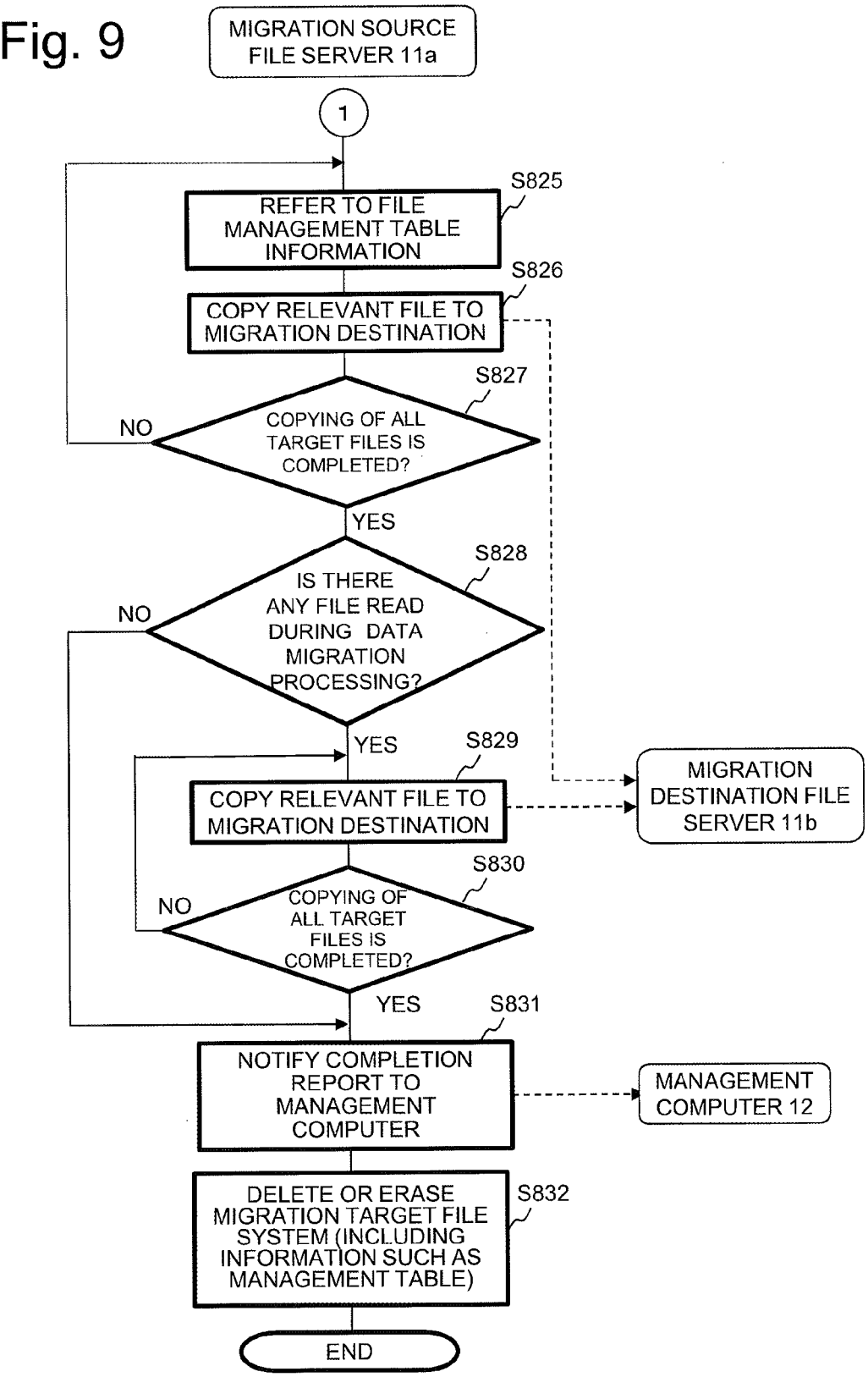
FIG. 9 is a flowchart of a "PUSH" type migration processing according to the migration source file server.

FIGS. 8 and 9 are flowcharts of a "PUSH" type migration processing in a migration source file server.

In S801, the management computer 12 transmits a "PUSH" type migration execution request, information of the file management table 30 and folder-unit capacity information to the migration source file server 11a (or the migration source storage subsystem 10a). The "PUSH" type migration execution request is determined by the migration type determination processing of FIG. 7, while the information of the file management table 30 and the folder-unit capacity information is determined by the migration source file system scan processing of FIG. 5 or the migration source file system monitor processing of FIG. 6. In S802, the management computer 12 determines whether the "PUSH" type migration requested by the management computer 12 has been completed or not based on the migration source storage subsystem 10a. That is, the determination is performed by whether the management computer 12 has received a completion notice from the migration source storage subsystem 10a or not.

In S811, the migration source file server 11a receives a migration execution request and related information (such as the information of the file management table 30 and the folder-unit capacity information) from the management computer 12. In S812, the migration source file server 11a points to (designates) the root (top tree folder) of the migration target file system (such as FS1 117 of FIG. 1) in the migration source storage subsystem 10a as the search start position.

In S813, the migration source file server 11a searches the directory tree (inode) from the root, and copies the directory structure (such as the root, Dir-A and Dir-B in FS1 117 of FIG. 1) via the migration destination file server 11b to the migration destination storage subsystem 10b. That is, the searched directory structure is copied to the migration destination file server 11b by a write access base (a system where the migration source file server 11a acts as a subject to write data to the migration destination file server 11b and performs migration) from the migration source file server 11a.

In S814, the migration source file server 11a refers to the information of the file management table 30 received from the management computer 12, and executes the file information (file name 302) registered in the file management table 30.

In S815, the migration source file server 11a determines whether a file already registered in the file management table 30 exists within the relevant folder or not. That is, the migration source file server 11a determines whether a file having the same name as the file name 302 of the file executed in S814 exists in the folder currently being searched. If an identical file does not exist (NO), the migration source file server 11a executes S817, and if an identical file exists (YES), it executes S816.

In S816, the migration source file server 11a sorts folders sequentially from those having the smallest folder-unit data capacity, and registers the same in a non-priority processing queue. In S817, the migration source file server 11a sorts folders sequentially from those having the largest folder-unit data capacity, and registers the same in a priority processing queue. According to this process S817, data migration is performed from the migration source storage subsystem 10a to the migration destination storage subsystem 10b, prioritizing the folders having greater folder capacity and smaller access frequency. This registration to the priority queue and the non-priority queue can also be performed in file units having smaller granularity instead of in folder units.

In S818, the migration source file server 11a determines whether searching of all directory structures in the migration source storage subsystem 10a and the copying of the searched directory structures to the migration destination storage subsystem 10b have been completed or not. If copying is completed (YES), the migration source file server 11a executes S819, and if not completed (NO), it executes the processes of S813 and thereafter again.

In S819, the migration source file server 11a copies the files within the relevant folder from the migration source storage subsystem 10a to the migration destination storage subsystem 10b based on the order of the priority queue. The migration source file server 11a updates the status of the consistency (migration/recall) flag 307 in the entry of the file management table 30 of the file whose copy has been completed from "OFF" to "ON". In S820, the migration source file server 11a determines whether copying of all target files has been completed or not. If copying has been completed (YES), the migration source file server 11a executes S821, and if copying has not been completed (NO), it executes S819 again. In the processes from S813 to S818, the copying of the directory structure to the migration destination storage subsystem 10b and the selection of priority migration files and non-priority migration files is completed. Further, according to the processes of S819 and S820, the files having a small access frequency and a large capacity can be migrated with priority from the migration source storage subsystem 10a to the migration destination storage subsystem 10b.

In S821, the migration source file server 11a confirms the files within the relevant folder based on the order of the non-priority queue. In S822, the migration source file server 11a determines whether the relevant file is already registered in the file management table 30 or not. If it is already registered (YES), the migration source file server 11a executes S824, and if not (NO), it executes S823.

In S823, the migration source file server 11a copies the relevant file via the migration destination file server 11b to the migration destination storage subsystem 10b by a WRITE access base. In S824, the migration source file server 11a determines whether copying of all target files has been completed or not. At the point of time when the processing of S824 has been completed and the process moves onto S825, copying of file groups not registered in the file management table 30 to the migration destination storage subsystem 10b is completed.

In S825, the migration source file server 11a refers to the information of the file management table 30, and extracts files which are not yet copied to the migration destination storage subsystem 10b. In S826, the migration source file server 11a copies the relevant file (file extracted in S825) to the migration destination storage subsystem 10b, and updates the status of the consistency (migration/recall) flag 307 from "OFF" to "ON". In S827, the migration source file server 11a determines whether the copying of all target files has been completed or not. If copying is completed (YES), the migration source file server 11a executes S828, and if not (NO), it executes S825 again.

Since it is possible that information of a new file is registered in the file management table 30 during execution of the data migration processing from processes S813 to S827, not necessarily all the files registered in the file management table 30 are subjected to data migration. Therefore, the migration source file server 11a executes the processes of S828 and thereafter, and performs data migration to the migration destination storage subsystem 10b of the data of the updated or newly stored file.

In S828, the migration source file server 11a determines whether a newly written file or an updated file exists during the data migration processing from S811 to S827. If such file exists (YES), the migration source file server 11a executes S829, and if not (NO), it executes S831. In S829, the migration source file server 11a copies the relevant file (newly written file or update file) to the migration destination storage subsystem 10b. In S830, the migration source file server 11a determines whether the copying of all target files has been completed or not. If copying has been completed (YES), the migration source file server 11a executes S831, and if not, it executes S829 again.

In S831, the migration source file server 11a notifies a completion report to the management computer 12. In S832, the migration source file server 11a either deletes or erases the file system being the target of data migration. In the present process S832, information of the file management table 30, the file metadata and the like are also deleted or erased. The management computer 12 having received the completion notice ends S802, and completes the "PUSH" type migration processing in the migration source file server.

According to the above-described "PUSH" type data migration processing, data migration is performed with priority from the tree position (folder) having a low access frequency and high folder capacity ratio, so that data migration with a high transfer efficiency is realized. Similarly, data transfer can also be performed by determining the order of priority in file units, so that data migration having a high transfer efficiency is enabled.

<Write Request Processing During "PUSH" Type Migration Processing>

Figure 10:
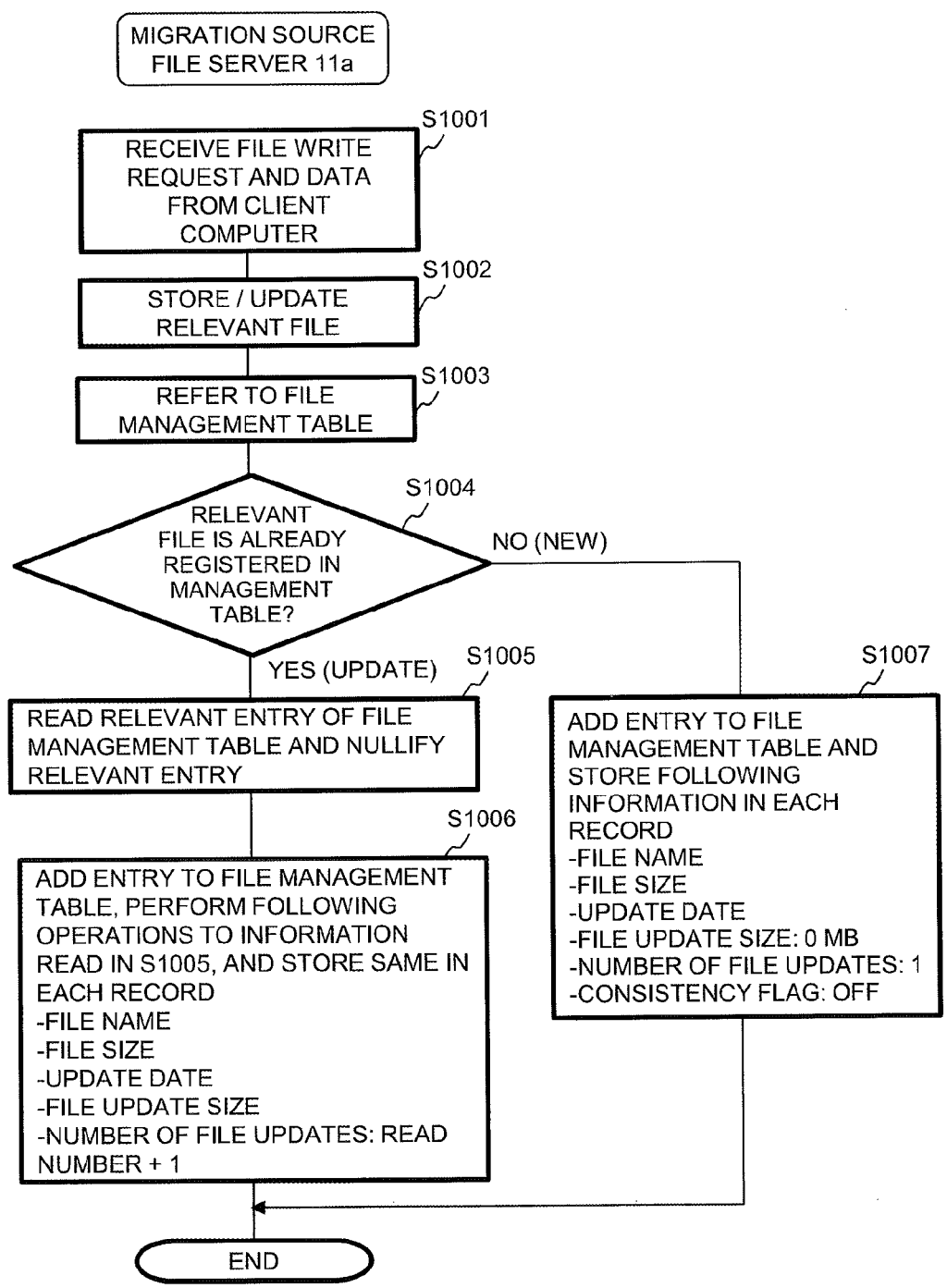
FIG. 10 is a flowchart illustrating a process performed when a write request is received during the "PUSH" type migration processing.

FIG. 10 is a flowchart illustrating the process performed when a Write request has been received during the "PUSH" migration processing.

In S1001, the migration source file server 11a receives a file write request and write data from the client computer 13. In S1002, if the relevant file is a newly written file, the migration source file server 11a stores the same in a file system 117 of the migration source storage subsystem 10a. If it is an update of an existing file, the migration source file server 11a reads the update target file from the migration source storage subsystem 10a and updates the same by the write data, and stores the updated file in the migration source storage subsystem 10a. In S1003, the migration source file server 11a refers to the information (file name 302) in the file management table 30. In S1004, the migration source file server 11a confirms whether the relevant file is already registered in the file management table 30 (identical file name exists in file name 302) or not. If the file is already registered in the file management table 30 (YES: update), the migration source file server 11a determines that the operation is a file update and executes S1005, and if the file is not registered (NO: new), it executes S1007.

In S1005, the migration source file server 11a reads the relevant entry of the file management table 30, and nullifies the relevant entry. In S1006, the migration source file server 11a adds an entry to the file management table 30, performs the following processes (R41) to (R45) to the information read in S1005, and stores the process result in the respective records.

(R41) Confirm whether the file name 302 is identical or not
(R42) Update file size 303
(R43) Update date and time of update 304
(R44) Update file update size 305

(R45) Store value having incremented the read value (number of times of update) to number of file updates 306

In S1007, the migration source file server 11a adds an entry to the file management table, and stores the following information (R51) through (R56) to the respective records.
(R51) File name 302
(R52) File size 303
(R53) Date and time of update 304
(R54) File update size 305: 0 MB
(R55) Number of file updates 306: 1
(R56) Consistency flag 307: Off The process S1007 is aimed at moving the entry of the update file to the end. By moving the entry to the end, even if the file is already copied to the migration destination storage subsystem 10b, copying is performed again by the management computer 12. According to the above-described process, the migration source file server 11a can process the access requests (file update request, new file write request) from the client computer 13 even during "PUSH" type data migration.

<"PULL" Type Migration Processing>

Figure 11:
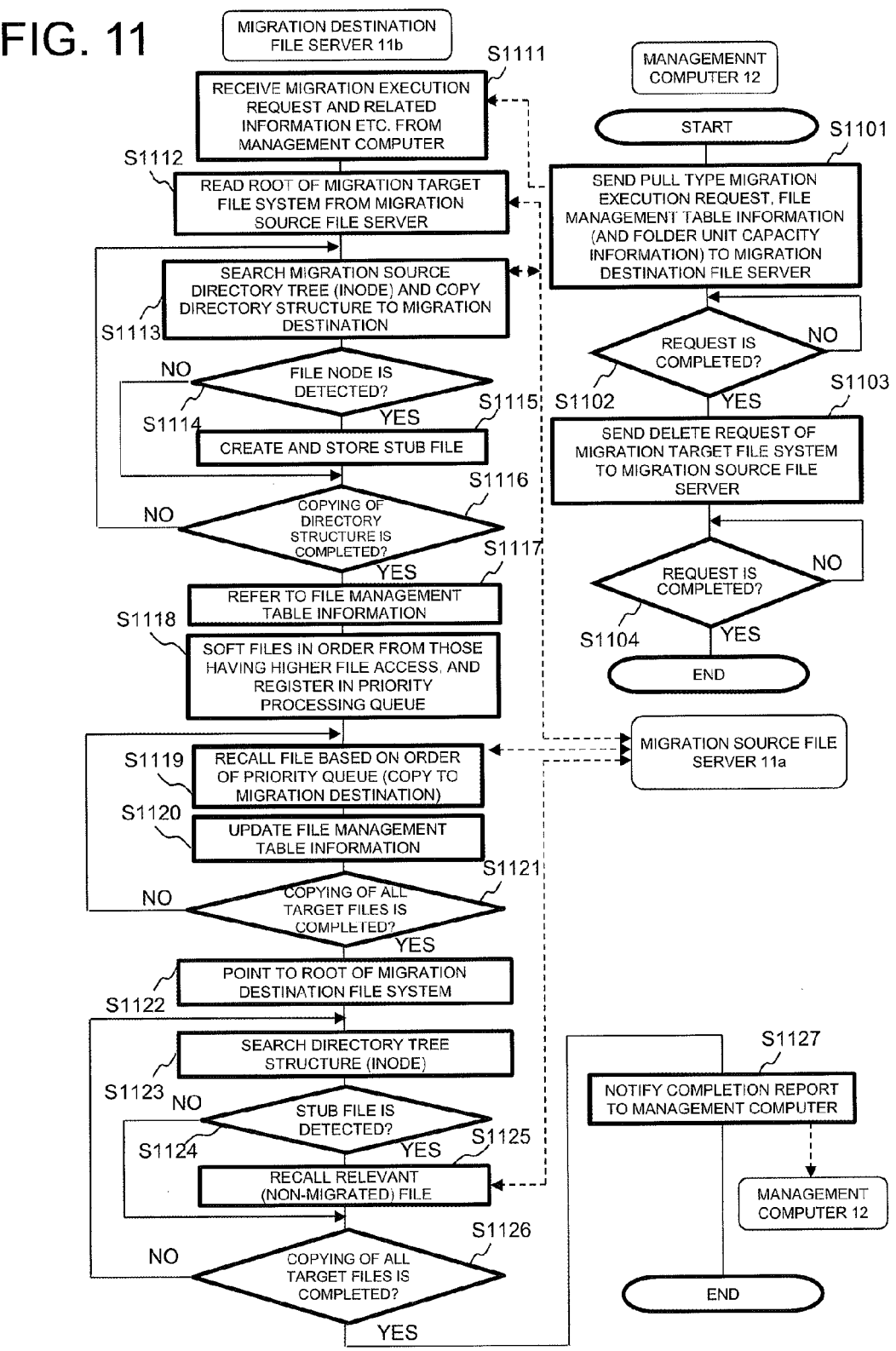
FIG. 11 is a flowchart illustrating a "PULL" type migration processing in the migration destination file server.

FIG. 11 is a flowchart of a "PULL" type migration process in the migration destination file server.

In S1101, the management computer 12 transmits a "PULL" type migration execution request, file management table information and folder-unit capacity information to the migration destination file server 11b (or the migration destination storage subsystem 10b). In S1102, the management computer 12 determines whether the "PULL" type migration execution request has been completed or not. The present process is equivalent to S802. In S1103, the management computer 12 transmits a request to delete the migration target file system to the migration source file server 11a (or the migration source storage subsystem 10a). In S1104, the management computer 12 determines whether the delete request has been completed or not. If the delete request has been completed, the management computer 12 ends the present processing. If the delete request has not been completed, the management computer 12 waits until the request is completed.

In S1111, the migration destination file server 11b receives a migration execution request and related information (information of the file management table 30 and the folder-unit capacity information) and the like from the management computer 12. In S1112, the migration destination file server 11b reads the root information (top directory information) of the migration target file system (FS1 117 of FIG. 1) from the migration source file server 11a. In S1113, the migration destination file server 11b searches the directory tree (inode) of the migration source file server 11a (migration source storage subsystem 10a), and copies the directory structure to the migration destination storage subsystem 10b.

In S1114, the migration destination file server 11b determines whether a file node (file) has been detected in the folder in the directory structure. If a file node is (YES), the migration destination file server 11b executes S1115, and if not detected (NO), it executes S1116. In S1115, the migration destination file server 11b generates a stub file, and stores the same in the folder in which the file node has been detected. Then, the migration destination file server 11b generates a stub file (sets a stub file attribute to the inode attribute information: only the metadata of the file is stored), and stores the generated stub file in the relevant folder. The migration destination file server 11b executes the processing of the present step S1115 to all the files detected within the folder. In S1116, the migration destination file server 11b determines whether the copying of the directory structure has been completed or not, wherein if the copying is completed (YES), it executes S1117, and if not (NO), it executes the processes of S1113 and thereafter again.

In S1117, the migration destination file server 11b refers to the information of the file management table 30 having been received from the management computer 12. In S1118, the migration destination file server 11b sorts the files in the order from those having high number of file accesses, and registers the same in the priority processing queue. If there are multiple files having the same number of accesses, the migration destination file server 11b registers the file having a smaller file size with higher order of priority to the priority processing queue. That is, by performing data migration of a file having a smaller size in a short time, it becomes possible to increase the number of files having a high number of accesses stored in the migration destination file server 11b having a high access performance at an early stage, so that the response performance can be improved.

In S1119, the migration destination file server 11b recalls files (copies files from the migration source file server 11a via the migration destination file server 11b to the migration destination storage subsystem 10b) according to the order of the priority queue. In S1120, the migration destination file server 11b updates the file management table information 30. That is, it updates the information in the consistency flag 307 of the file whose recall has been completed from "OFF" to "ON" (recalled). In S1121, the migration destination file server 11b determines whether copying of all target files has been completed or not, and if not completed (NO), it executes the processes of S1119 and thereafter again.

In S1122, the migration destination file server 11b points to (designates) the root (top directory) of the migration destination file system (directory structure of the file system copied from the migration source storage subsystem 10a) in the migration destination storage subsystem 10b as the search position. In S1123, the migration destination file server 11b searches the directory tree structure (inode). In S1124, the migration destination file server 11b determines whether a stub file has been detected in the folder of the directory tree structure or not. If a stub file is detected, the migration destination file server 11b determines that a non-migrated file exists, and executes S1125.

In S1125, the migration destination file server 11b recalls the relevant (non-migrated) file from the migration source file server 11a (or the migration source storage subsystem 10a). That is, the migration destination file server 11b reads a file in a READ access base with respect to the migration source file server 11a (a method where the migration destination file server 11b acts as the subject to read and migrate data from the migration source file server 11a), and performs data migration. In S1126, the migration destination file server 11b determines whether the copying of all target files has been completed or not. If the copying of all target file has been completed (YES), then in S1126, the migration destination file server 11b notifies a completion notice to the management computer 12, and the management computer 12 having received the completion notice ends the "PULL" type migration processing in the migration destination file server.

According to the above-mentioned "PULL" type data migration processing, the files having higher access frequencies can be migrated in a prioritized manner to a new server having a higher access processing performance (to the side of the migration destination file server 11b), so that it becomes possible to prevent response delay caused by the operation of files by the user.

<Read/Write Access Processing During "PULL" Type Migration Processing>

Figure 12:
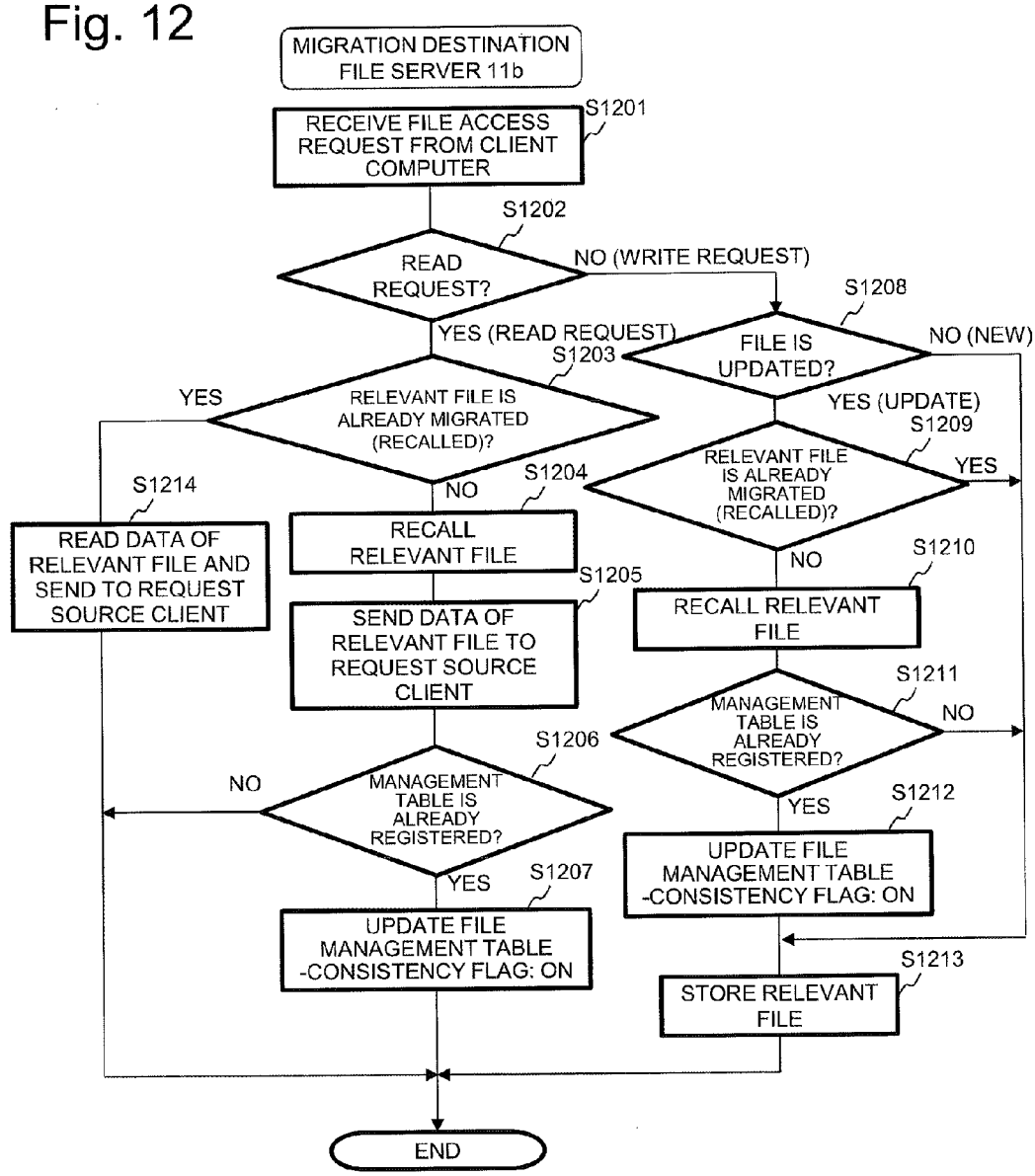
FIG. 12 is a flowchart illustrating a process performed when a Read/Write access received during the "PULL" type migration processing.

FIG. 12 is a flowchart illustrating a process for receiving a Read/Write access while performing the "PULL" type migration processing.

In S1201, the migration destination file server 11b receives a file access request from the client computer 13. In S1202, the migration destination file server 11b determines whether the request is a Read request. In S1203, the migration destination file server 11b determines whether the Read request file is already subjected to data migration (recalled) or not. If the file is not already migrated (recalled) (S1203: NO), the migration destination file server 11b recalls the Read request file in S1204. If the file is already migrated (recalled) (S1203: YES), the migration destination file server 11b executes S1214, reads the data (recalled data) of the Read request file from the migration destination storage subsystem 10b, and transmits the same to the request source client computer 13.

Since data migration (copying of actual data) to the migration destination file server 11b is completed by the process of S1204, the migration destination file server 11b clears the stub file attribute of the inode attribute information. In S1205, the migration destination file server 11b transmits the data of the Read request file (recalled data) to the request source client computer 13. In S1206, the migration destination file server 11b determines whether the Read request file is already registered in the file management table 30 or not. If it is already registered (YES), the migration destination file server 11b updates the information of the consistency flag 307 of the file management table 30 from "OFF" to "ON" in S1207.

In S1208, the migration destination file server 11b determines whether the access request is a file update or not. If it is a file update (YES), the migration destination file server 11b determines whether the file scheduled to be updated in S1209 is already subjected to data migration (recalled) or not. If it is not already migrated (recalled) (NO), the migration destination file server 11b recalls this file in S1210. This process S1210 is the same as process S1204, wherein the migration destination file server 11b clears the stub file attribute of the inode attribute information.

In S1211, the migration destination file server 11b determines whether the file management table 30 is already registered or not. If it is already registered (YES), in S1212, the migration destination file server 11b updates the consistency flag 307 of the file management table 30 to "ON", similar to S1207. In S1213, the migration destination file server 11b stores the relevant file. According to the present process S1213, similar to S1204 and S1210, the migration destination file server 11b clears the stub file attribute of the inode attribute information. In the file storing process of S1213, the migration destination storage subsystem 10b stores the data as it is when there is a write request of a new file, but when a file is updated, the recalled file is updated and the updated file is stored.

According to the above-described process, the migration destination file server 11b can process access requests (file operation requests) from the client computer 13 even during "PULL" type data migration.

Embodiment 2

HYBRID Migration Processing

Figure 13:
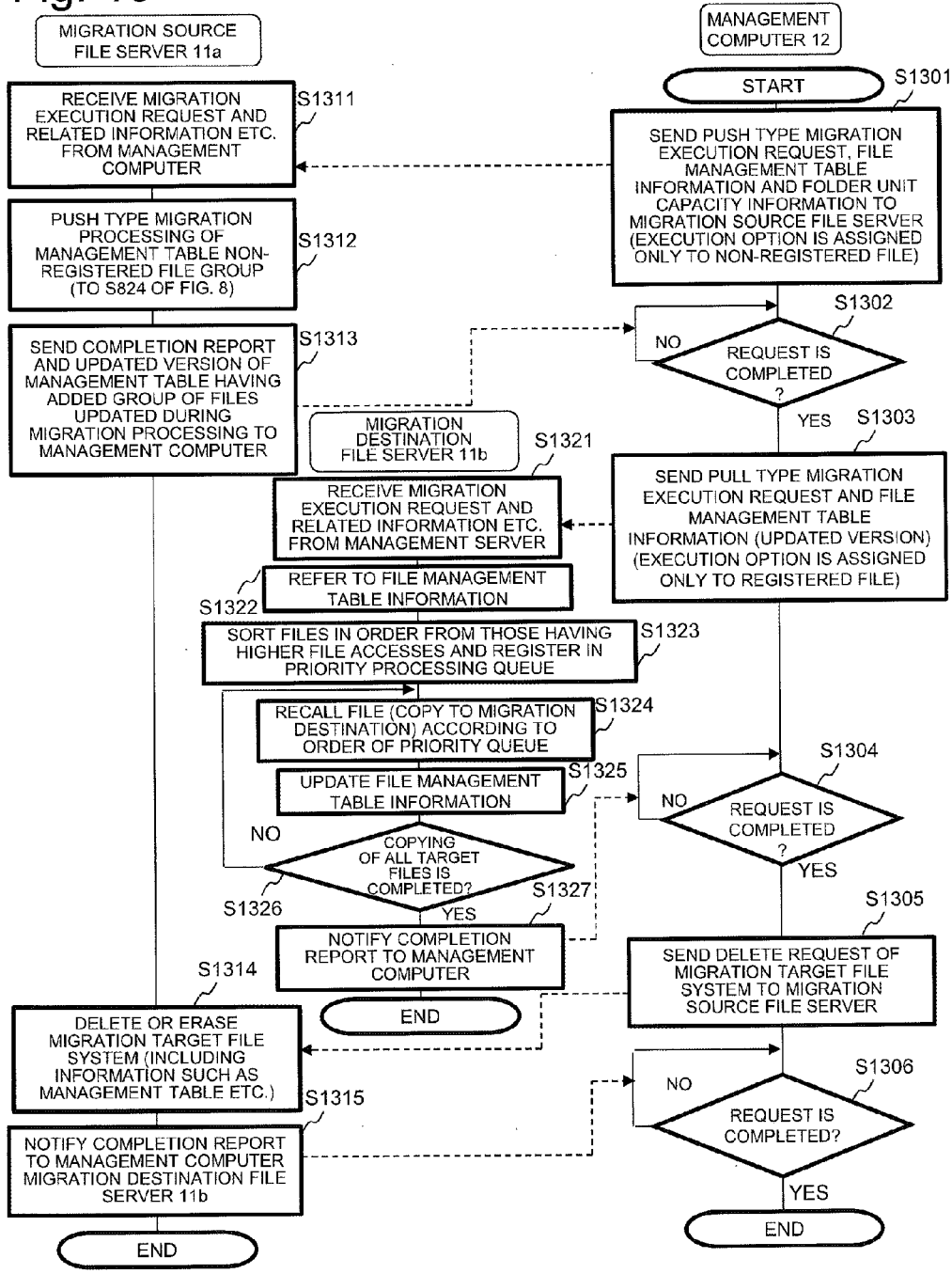
FIG. 13 is a flowchart illustrating a process performed when the "PUSH" type migration in the migration source file server and the "PULL" type migration in the migration destination file server are used in combination.

FIG. 13 is a flowchart showing the processing performed by performing the "PUSH" type migration in the migration source file server and the "PULL" type migration in the migration destination file server in combination. In the "PUSH" type migration, when a migrated file is updated in the migration source file server 11a during migration of data to the migration destination file server 11b, the migration source file server 11a must transmit the file again to the migration destination file server 11b, so that the data transfer efficiency (data migration efficiency) is deteriorated. Therefore, the files having no accesses (including files having a low access frequency) are copied from the migration source file server 11a having a small overhead via a "PUSH" type migration to the migration destination file server 11b, and at the point of time when the copying process is completed, the remaining files other than the file having no accesses are migrated together with the files having been updated during the data migration processing from the migration destination file server 11b via a "PULL" type migration. As described, since the occurrence of re-transmission of files can be suppressed by a process performing the "PUSH" type data migration and the "PULL" type data migration in combination ("HYBRID type" data migration), the data transfer efficiency can be improved.

In S1301, the management computer 12 transmits a "PUSH" type migration execution request, related information (information of the file management table 30 and folder-unit capacity information) and so on to the migration source file server 11a (or the migration source storage subsystem 10a). During transmission of this request, execution options during data migration are assigned only to files that are not registered in the file management table 30. In other words, the management computer 12 performs write-based data migration of only the files that are not registered in the file management table 30 from the migration source storage subsystem 10a to the migration destination storage subsystem 10b. In S1302, the management computer 12 determines whether the request is completed or not. This process is the same as S802 and S1102.

In S1311, the migration source file server 11a receives a "PUSH" type migration execution request, related information and so on from the management computer 12. In S1312, the migration source file server 11a executes a "PUSH" type migration processing (up to process S824 of FIG. 8) targeting a group of files not registered in the file management table 30. In S1313, the migration source file server 11a sends the completion notice and the file management table 30 having updated and added the group of files having been updated during the migration process to the management computer 12. The management computer 12 having received the completion notice exits the loop processing of S1302, and executes S1303.

In S1303, the management computer 12 transmits a "PULL" type migration execution request and the information of the updated file management table 30 to the migration destination file server 11b (or the migration destination storage subsystem 10b). At this time, similar to S1301, the management computer 12 assigns an execution option during data migration only to the files registered in the file management table 30, and performs transmission. In other words, the management computer 12 causes the migration destination storage subsystem 10b to perform read-based data migration of only the registered files in the file management table 30 from the migration source storage subsystem 10a. In S1304, the management computer 12 determines whether the data migration request has been completed or not. This process is the same as S802 and S1102.

In S1321, the migration destination file server 11b receives the migration execution request, related information and the like from the management computer 12. In S1322, the migration destination file server 11b refers to the information in the file management table 30. In S1323, the migration destination file server 11b sorts files in order from those having higher number of file accesses (including the number of times of file update 306), and registers the same in the priority processing queue. In S1324, the migration destination file server 11b recalls the files (copies the same to the migration destination storage subsystem 10b) based on the order of the priority queue.

In S1325, the migration destination file server 11b updates the file management table information 30. That is, the migration destination file server 11b sets the consistency flag 307 related to the recalled file to "ON". In S1326, the migration destination file server 11b determines whether the copying of all target files has been completed or not. In S1327, the migration destination file server 11b sends a copy completion report to the management computer 12.

In S1305, the management computer 12 having received the data migration completion notice from the migration destination file server 11b transmits a delete request of the migration target file system to the migration source file server 11a (or the migration source storage subsystem 10a). In S1314, the migration source file server 11a deletes or erases the migration target file system (including the management information such as the file management table 30). In S1315, the migration source file server 11a sends a delete completion report to the management computer 12. In S1306, the management computer 12 determines whether the delete request has been completed or not. When the management computer 12 receives the delete completion notice from the migration source file server 11a, it ends the "HYBRID type" data migration processing.

The migration source file server 11a performs "PUSH" type data migration prioritizing the files having a small access frequency and a large capacity to the migration destination file server 11b. After the "PUSH" type data migration is completed, the migration destination file server 11b performs a "PULL" type data migration of the non-migrated files and files having been updated during the data migration processing. As described, by performing a process where the "PUSH" type data migration and the "PULL" type data migration are performed in combination ("HYBRID type" data migration), the occurrence of re-transmission of files can be suppressed, and the data transfer efficiency can be improved. Furthermore, since files having a high access frequency can be migrated at an early stage to the migration destination file server 11b having a high access performance, the access performance can also be improved.

According to the following description, the management computer 12 is intervened between the migration source file server 11a (or the migration source storage subsystem 10a) and the migration destination file server 11b (or the migration destination storage subsystem 10b) to perform "PUSH" type, "PULL" type or "HYBRID type" data migration. However, the present invention is not restricted to such configuration, and various types of data migration can be performed between the migration source file server 11a (or the migration source storage subsystem 10a) and the migration destination file server 11b (or the migration destination storage subsystem 10b) without having the management computer 12 intervened. Furthermore, various types of data migration can also be performed only by the migration source storage subsystem 10a and the migration destination storage subsystem 10b.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations. A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory media such as an IC card, an SD card or a DVD. Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

10a: Migration source storage subsystem
10b: Migration destination storage subsystem
11a: Migration source file server
11b: Migration destination file server
12: Management computer
13: Client computer
30: File management table
31: Migration execution program
111, 121: CPU
112, 122: Memory
127: Main migration program
400: CPU
430: Memory
450: Shared memory

The invention claimed is:

1. A storage system having storage subsystems coupled to one or more client computers, and sharing and storing files to be accessed the storage system comprising:
   a first storage subsystem, and a second storage subsystem newly performing file sharing instead of the first storage subsystem;
   wherein a first data migration method (PUSH type) where the first storage subsystem writes files in the first storage subsystem to the second storage subsystem to perform data migration, and a second data migration method (PULL type) where the second storage subsystem reads the files in the first storage subsystem and stores the read data in the second storage subsystem to perform data migration are switched selectively to perform data migration of files from the first storage subsystem to the second storage subsystem, and wherein the first storage subsystem:
   determines an access characteristics based on an access frequency and an update frequency of each file in the first storage subsystem;
   classifies the files in the first storage subsystem into a first file group having a high possibility of being accessed and a second file group having a low possibility of being accessed;

when the first data migration method (PUSH type) is selected to perform data migration, files of the second file group are subjected to data migration to the second storage subsystem, and after completing data migration, files of the first file group are subjected to data migration to the second storage subsystem;

when the second data migration method (PULL type) is selected to perform data migration, the files of the first file group are subjected to data migration to the second storage subsystem, and after completing data migration, files of the second file group are subjected to data migration to the second storage subsystem; and the files of the first file group are subjected to data migration from files having smaller file sizes, and the files of the second file group are subjected to data migration from files having greater file sizes.

2. The storage system according to claim 1, wherein the switching of the first data migration method (PUSH type) and the second data migration method (PULL type) is performed based on one or more of the following: an access frequency of each file or each folder storing the file in the first storage subsystem, an access type rate, a file capacity or folder capacity, an access performance from the client computer to the first storage subsystem or the second storage subsystem, and a file update frequency.

3. The storage system according to claim 1, wherein during data migration via the first data migration method (PUSH type), if there is a file already subjected to data migration to the second storage subsystem and updated in the first storage subsystem based on an update request from the client computer, the first storage subsystem performs data migration again of the updated file to the second storage subsystem.

4. The storage system according to claim 1, wherein during data migration via the second data migration method (PULL type) performed by the second storage subsystem, regarding a file whose data is not yet migrated to the second storage subsystem, if an update request from the client computer is received, the second storage subsystem reads the file subjected to the update request from the first storage subsystem and updates the same, and stores the updated file in the second storage subsystem; and if a read request from the client computer is received, the second storage subsystem reads the file from the first storage subsystem and stores the same, and further sends the file to the client computer.

5. A storage system having storage subsystems coupled to one or more client computers, and sharing and storing files to be accessed the storage system comprising:

a first storage subsystem, and a second storage subsystem newly performing file sharing instead of the first storage subsystem;

wherein a first data migration method (PUSH type) where the first storage subsystem writes files in the first storage subsystem to the second storage subsystem to perform data migration, and a second data migration method (PULL type) where the second storage subsystem reads the files in the first storage subsystem and stores the read data in the second storage subsystem to perform data migration are switched selectively to perform data migration of files from the first storage subsystem to the second storage subsystem, wherein the first storage subsystem:

determines an access characteristics based on the access frequency and the update frequency of the files by the first storage subsystem;

classifies files in the first storage subsystem into a first file group having a high possibility of being accessed and a second file group having a low possibility of being accessed; and performs data migration of files in the second file group via the first data migration method (PUSH type) to the second storage subsystem; and wherein the second storage subsystem: performs data migration of files in the first file group via the second data migration method (PULL type);

wherein the files of the first file group are subjected to data migration from files having smaller file sizes, and the files of the second file group are subjected to migration from files having greater file sizes.

6. A computer system comprising:

a first storage subsystem coupled to one or more client computers, and sharing and storing files to be accessed;

a first file server for controlling accesses to the first storage subsystem;

a second storage subsystem newly performing file sharing instead of the first storage subsystem;

a second file server for controlling accesses to the second storage subsystem; and a management computer for managing the first file server and the second file server;

wherein the management computer selectively switches a first data migration method (PUSH type) where the first file server writes files in the first file server to the second file server to perform data migration and a second data migration method (PULL type) where the second file server reads the files in the first file server and stores the read data in the second file server to perform data migration, to perform data migration of files from the first file server to the second file server, and wherein the management computer:

determines an access characteristics based on an access frequency and an update frequency of each file in the first file server;

classifies the files in the first file server into a first file group having a high possibility of being accessed and a second file group having a low possibility of being accessed;

when the first data migration method (PUSH type) is selected to perform data migration, files of the second file group are subjected to data migration from the first file server to the second file server, and after completing data migration, files of the first file group are subjected to data migration from the first file server to the second file server;

when the second data migration method (PULL type) is selected to perform data migration, the files of the first file group are subjected to data migration from the first file server to the second file server, and after completing data migration, files of the second file group are subjected to data migration from the first file server to the second file server.

7. The computer system according to claim 6, wherein the switching of the first data migration method (PUSH type) and the second data migration method (PULL type) is performed based on one or more of the following by the management computer: an access frequency of each file or each folder storing the file in the first file server, an access type rate, a file capacity or folder capacity, an access performance from the client computer to the first file server or the second file server, and file update frequency.

8. The computer system according to claim 6, wherein during data migration via the first data migration method (PUSH type), if there is a file already subjected to data migration to the second file server and updated in the first file server based on an update request from the client computer, the management computer performs data migration of the updated file again from the first file server to the second file server.

9. The computer system according to claim 6, wherein during data migration via the second data migration method (PULL type) performed by the second file server, regarding a file whose data is not yet migrated to the second file server, if an update request from the client computer is received, the second file server reads the file subjected to the update request from the first file server and updates the same, and stores the updated file in the second storage subsystem; and if a read request from the client computer is received, the second file server reads the file from the first file server and stores the same, and further sends the file to the client computer.

10. A computer system comprising:
a first storage subsystem coupled to one or more client computers, and sharing and storing files to be accessed;
a first file server for controlling accesses to the first storage subsystem;
a second storage subsystem newly performing file sharing instead of the first storage subsystem;
a second file server for controlling accesses to the second storage subsystem; and
a management computer for managing the first file server and the second file server;
wherein the management computer selectively switches a first data migration method (PUSH type) where the first file server writes files in the first file server to the second file server to perform data migration and a second data migration method (PULL type) where the second file server reads the files in the first file server and stores the read data in the second file server to perform data migration, to perform data migration of files from the first file server to the second file server, wherein the management computer:
determines an access characteristics based on the access frequency and the update frequency of the files by the first file server;
classifies files into a first file group having a high possibility of being accessed and a second file group having a low possibility of being accessed;
performs data migration of files in the second file group via the first data migration method (PUSH type) from the first file server to the second file server; and
performs data migration of files in the first file group via the second data migration method (PULL type) from the first file server to the second file server.

* * * * *